United States Patent
Cho et al.

(10) Patent No.: US 12,305,299 B2
(45) Date of Patent: May 20, 2025

(54) METHOD FOR MANUFACTURING PHOTOELECTRODE

(71) Applicant: RESEARCH & BUSINESS FOUNDATION SUNGKYUNKWAN UNIVERSITY, Suwon-si (KR)

(72) Inventors: Hyungkoun Cho, Suwon-si (KR); Dong Su Kim, Yongin-si (KR); Sung Hyeon Jung, Hwaseong-si (KR); Jihoon Choi, Suwon-si (KR); Hakhyeon Lee, Suwon-si (KR); Heewon Suh, Suwon-si (KR); Kun Woong Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 302 days.

(21) Appl. No.: 17/742,908

(22) Filed: May 12, 2022

(65) Prior Publication Data

US 2022/0372640 A1    Nov. 24, 2022

(30) Foreign Application Priority Data

May 20, 2021    (KR) .................. 10-2021-0064671

(51) Int. Cl.
  *C25B 11/049*    (2021.01)
  *C25B 1/55*    (2021.01)
  *H01M 14/00*    (2006.01)

(52) U.S. Cl.
  CPC .............. *C25B 11/049* (2021.01); *C25B 1/55* (2021.01); *H01M 14/005* (2013.01)

(58) Field of Classification Search
  None
  See application file for complete search history.

(56) References Cited

U.S. PATENT DOCUMENTS

2008/0073222 A1 * 3/2008 Yamauchi ................ C23F 1/30
204/194

FOREIGN PATENT DOCUMENTS

KR    10-2082677 B1    2/2020

OTHER PUBLICATIONS

Yang et al ("Cu2O/CuO Bilayered Composite as a High-Efficiency Photocathode for Photoelectrochemical Hydrogen Evolution Reaction", Scientific Reports, vol. 6, Article No. 35158, 2016) (Year: 2016).*

Mohammadzadeh et al ("Electrochemical study of Cu2O/CuO composite coating produced by annealing and electrochemical methods", Journal of the Iranian Chemical Society, (2019) 16:2719-2729) (Year: 2019).*

(Continued)

*Primary Examiner* — Alexander W Keeling
(74) *Attorney, Agent, or Firm* — NSIP Law (57) ABSTRACT

The present application relates to a method for manufacturing a photoelectrode, the method comprising steps of impregnating a first transition metal oxide capable of performing photoreaction in an electrolyte, applying a voltage onto the electrolyte to generate an electrochemical oxidation reaction on the surface of the first transition metal oxide, and forming a second transition metal oxide thin film on the surface of the first transition metal oxide by irradiating light onto the first transition metal oxide at the same time as the step of applying the voltage.

12 Claims, 4 Drawing Sheets

(56) References Cited

OTHER PUBLICATIONS

Marathey et al ("Low temperature-controlled synthesis of hierarchical Cu2O/Cu(OH)2/CuO nanostructures for energy applications", Journal of Materials Research, vol. 34, 18, 2019). (Year: 2019).*

Zhang et al ("Highly stable copper oxide composite as an effective photocathode for water splitting via a facile electrochemical synthesis strategy", J. Mater. Chem., 2012, 22, 2456). (Year: 2012).*

Wijesundera ("Fabrication of the CuO/Cu2O heterojunction using an electrodeposition technique for solar cell applications", Semicond. Sci. Technol. 25 (2010) 045015 (5pp)). (Year: 2010).*

* cited by examiner

METHOD FOR MANUFACTURING PHOTOELECTRODE

CROSS REFERENCE TO RELATED APPLICATIONS

This application claims the benefit under 35 USC 119(a) of Korean Patent Application No. 10-2021-0064671, filed on May 20, 2021, in the Korean Intellectual Property Office, the entire disclosure of which is incorporated herein by reference for all purposes.

FIELD

The present application relates to a method for manufacturing a photoelectrode capable of generating a permanent photo-charging effect through the formation of an oxide layer thin film utilizing light absorption and photoelectrochemical oxidation reaction.

DESCRIPTION OF THE RELATED ART

As interest in high-efficiency photoelectrochemical materials increases, research on a metal oxide photoelectrode that can be used therefor and a method for manufacturing the same is being actively conducted.

Particularly, the heat treatment process of obtaining copper (II) oxide by reacting copper (I) oxide with oxygen in a high-temperature chamber has been studied as a part of a photoelectrode manufacturing method for manufacturing high-efficiency photoelectrochemical cells or other optoelectronic devices.

However, in the process of forming a copper (II) oxide thin film through heat treatment, there have been problems in that the reaction rate of copper (I) oxide is fast so that it is difficult to control the thickness, copper (II) oxide is formed non-uniformly due to partial reduction of oxygen partial pressure so that the quality of the copper (II) thin film is deteriorated, and due to this, there has been a difficulty that the efficiency of the device is not sufficiently secured.

Besides, there is also a problem of requiring expensive equipment capable of adjusting the gas flow in the chamber while maintaining a high temperature and vacuum state for the heat treatment process.

In order to overcome these problems, researches for controlling the crystallinity of copper (II) oxide by a method of adjusting the temperature, oxygen pressure, reaction time, etc. of the chamber during the heat treatment process and removing defects to improve the quality are being conducted.

However, nanoscale control of the reaction is difficult with only the heat treatment process, an unintentional secondary phase is formed at the copper (I) oxide phase interface, and there is a limit to improving the properties of the electrode so that a fundamental solution for solving this is being required.

Korean Registered Patent Publication No. 10-2082677, which is the background art of the present application, relates to a method for manufacturing a porous metal oxide thin film by performing heat treatment on a porous metal thin film, and it specifically comprises a step of performing heat treatment on a porous metal thin film formed on a substrate to manufacture a porous metal oxide thin film.

SUMMARY

The present application is to solve the above-described problems of the conventional art, and an object of the present application is to provide a method for manufacturing a photoelectrode causing a permanent photo-charging effect through the formation of an oxide layer utilizing light absorption and photoelectrochemical oxidation reaction.

Another object of the present application is to provide a photoelectrode manufactured by the above-mentioned manufacturing method and a photoelectrochemical cell comprising the photoelectrode.

However, the technical tasks to be achieved by the embodiments of the present application are not limited to the technical tasks described above, and another technical tasks may exist.

As a technical means for achieving the above-described technical task, a first aspect of the present application provides a method for manufacturing a photoelectrode, the method comprising steps of impregnating a first transition metal oxide capable of performing photoreaction in an electrolyte, applying a voltage onto the electrolyte to generate an electrochemical oxidation reaction on the surface of the first transition metal oxide, and forming a second transition metal oxide thin film on the surface of the first transition metal oxide by irradiating light onto the first transition metal oxide at the same time as the step of applying the voltage.

According to an embodiment of the present application, the oxidation reaction may be promoted on the surface of the first transition metal oxide by irradiating the light, and the surface defects of the first transition metal oxide may be self-healed by photo-charging, but the present application is not limited thereto.

According to an embodiment of the present application, the first transition metal oxide may include a material selected from the group consisting of $Cu_2O$, $TiO_2$, $Fe_2O_3$, $In_2O_3$, $Ta_2O_5$, $WO_3$, $ZnO$, $BiVO_4$, $BaSnO_3$, $CuWO_4$, $CuFeO_2$, and $BaTiO_3$, but the present application is not limited thereto.

According to an embodiment of the present application, the second transition metal oxide may include a material selected from the group consisting of $CuO$, $TiO_2$, $Fe_2O_3$, $In_2O_3$, $Ta_2O_5$, $WO_3$, $ZnO$, $BiVO_4$, $BaSnO_3$, $CuWO_4$, $CuFeO_2$, $BaTiO_3$, $SnO_2$, $CuBi_2O_4$, $Ga_2O_3$, $Bi_2O_3$, $Co_3O_4$, $V_2O_5$, and $NiO$, but the present application is not limited thereto.

According to an embodiment of the present application, the method for manufacturing the photoelectrode may be performed at room temperature, but the present application is not limited thereto.

According to an embodiment of the present application, the second transition metal oxide thin film may have a thickness of 1 nm to 100 nm, but the present application is not limited thereto.

According to an embodiment of the present application, the voltage may be 1.6 V to 3.0 V, but the present application is not limited thereto.

According to an embodiment of the present application, the electrolyte may have a pH of 8 to 13, but the present application is not limited thereto.

According to an embodiment of the present application, the first transition metal oxide may be formed on a substrate, but the present application is not limited thereto.

According to an embodiment of the present application, the substrate may be transparent, but the present application is not limited thereto.

According to an embodiment of the present application, the substrate may be one selected from the group consisting of ITO, metal nanowires, carbon nanotubes, and combinations thereof, but the present application is not limited thereto.

A second aspect of the present application provides a photoelectrode manufactured by the manufacturing method according to the first aspect of the present application.

A third aspect of the present application provides a photoelectrochemical cell comprising the photoelectrode according to the second aspect of the present application and a counter electrode, wherein the photoelectrode and the counter electrode are electrically connected.

According to an embodiment of the present application, the counter electrode may include a material selected from the group consisting of Pt, C, Au, Cu, Fe, Ni, Ir, Pd, and Ta, but the present application is not limited thereto.

The above-described problem solving means are merely exemplary, and should not be construed as an intention of limiting the present application. In addition to the exemplary embodiments described above, additional embodiments may exist in the drawings and detailed description of the invention.

In general, the formation of an oxide layer thin film by the heat treatment process has a fast reaction so that nanoscale control is impossible, and the uniformity is deteriorated. On the other hand, the method for manufacturing a photoelectrode according to the present application generates an electrochemical reaction on the device surface and forms an oxide layer thin film through a slow reaction so that it is possible to control the oxide layer thin film in nano units during the reaction, and forms a uniform oxide layer thin film with respect to the entire device so that the electrical and optical properties of the photoelectrode are improved as a result.

Further, although the oxide layer thin film formed by the heat treatment process causes many defects at the interface due to a crystal structure different from that of an existing device, the oxide layer thin film formed through the method for manufacturing a photoelectrode according to the present application is subjected to epitaxial growth in the existing device so that defects at the interface are improved.

Further, according to the method for manufacturing a photoelectrode according to the present application, the photoelectrochemical efficiency of the first transition metal oxide is improved as defect sites on the surface of the first transition metal oxide are self-healed due to the photo-charging effect.

Further, expensive equipment capable of adjusting the gas flow in the chamber while maintaining high temperature and vacuum state is required for the heat treatment process, but the method for manufacturing a photoelectrode according to the present application does not require expensive equipment since the reaction is performed at room temperature. Therefore, the process cost can be greatly reduced.

However, the effects obtainable in the present application are not limited to the effects as described above, and another effects may exist.

DETAILED DESCRIPTION

Hereinafter, embodiments of the present application will be described in detail with reference to the accompanying drawings so that those with ordinary skill in the art to which the present application pertains will easily be able to implement the present application.

However, the present application may be implemented in various different forms and is not limited to the embodiments described herein. Further, parts irrelevant to the description are omitted in order to clearly describe the present application in the drawings, and similar reference numerals are attached to similar parts throughout the specification.

In the whole specification of the present application, when a part is said to be "connected" with other part, it not only includes a case that the part is "directly connected" to the other part, but also includes a case that the part is "electrically connected" to the other part with another element being interposed therebetween.

In the whole specification of the present application, when any member is positioned "on", "over", "above", "beneath", "under", and "below" other member, this not only includes a case that the any member is brought into contact with the other member, but also includes a case that another member exists between two members.

In the whole specification of the present application, if a prescribed part "includes" a prescribed element, this means that another element can be further included instead of excluding other elements unless any particularly opposite description exists.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of constituent elements described in the Markush type expression, means including one or more selected from the group consisting of the constituent elements.

In the whole specification of the present application, description of "A and/or B" means "A, B, or A and B".

Hereinafter, a photoelectrode according to the present application causing a permanent photo-charging effect through the formation of an oxide layer and a method for manufacturing the same will be described in detail with reference to embodiments, examples, and drawings. However, the present application is not limited to such embodiments, examples, and drawings.

As a technical means for achieving the above-mentioned technical tasks, the first aspect of the present application provides a method for manufacturing a photoelectrode, the method comprising steps of impregnating a first transition metal oxide capable of photoreaction in an electrolyte, applying a voltage onto the electrolyte to generate an electrochemical oxidation reaction on the surface of the first transition metal oxide, and forming a second transition metal oxide thin film on the surface of the first transition metal oxide by irradiating light onto the first transition metal oxide at the same time as the step of applying the voltage.

According to an embodiment of the present application, all steps of the reaction may be performed at room temperature, but the present application is not limited thereto.

The method for manufacturing a photoelectrode according to the present application does not require expensive equipment for maintaining high temperatures since the reaction is performed at room temperature.

First, a first transition metal oxide capable of photoreaction is impregnated in an electrolyte (S100).

According to an embodiment of the present application, the first transition metal oxide may include a material selected from the group consisting of $Cu_2O$, $TiO_2$, $Fe_2O_3$, $In_2O_3$, $Ta_2O_5$, $WO_3$, $ZnO$, $BiVO_4$, $BaSnO_3$, $CuWO_4$, $CuFeO_2$, and $BaTiO_3$, and may preferably be $Cu_2O$, but the present application is not limited thereto.

According to an embodiment of the present application, the first transition metal oxide may be formed on a substrate, but the present application is not limited thereto.

The substrate may be removed after manufacturing the photoelectrode, or may not be removed according as a transparent substrate is used.

The substrate may be, for example, one which is transparent, and may be, for example, one selected from the group consisting of ITO, metal nanowires, carbon nanotubes, and combinations thereof, but the present application is not limited thereto.

The electrolyte may be, for example, one containing hydroxide ions ($OH^-$) in the electrolyte. Accordingly, according to an embodiment of the present application, the electrolyte may have a pH of 8 to 13, and for example, the electrolyte may have a pH of 11, but the present application is not limited thereto.

Subsequently, a voltage is applied onto the electrolyte to generate an electrochemical oxidation reaction on the surface of the first transition metal oxide (S200).

The first transition metal oxide electrode is reacted with hydroxide ions ($OH^-$) in the electrolyte through the voltage application so that the surface of the first transition metal oxide may be oxidized into a second transition metal oxide thin film.

A second transition metal oxide thin film is formed on the surface of the first transition metal oxide by irradiating light onto the first transition metal oxide at the same time as the step of applying the voltage (S300).

The second transition metal oxide thin film is an oxide layer thin film formed by additionally proceeding an oxidation reaction on the surface of the first transition metal oxide.

Light is irradiated simultaneously with the voltage application, thereby allowing photoholes ($h^+$) generated by photoexcitation to participate in the oxidation reaction of the first transition metal oxide so that the activation energy of the oxidation reaction may be lowered, and the reaction may be induced at a lower voltage.

According to an embodiment of the present application, the oxidation reaction may be promoted on the surface of the first transition metal oxide by irradiating the light, and the surface defects of the first transition metal oxide may be self-healed by photo-charging, but the present application is not limited thereto.

As in the existing process, when an additional oxide layer thin film is formed on the surface of the metal oxide by a heat treatment process, the reaction proceeds very quickly so that it is impossible to control the oxide layer thin film in nano units, and thus the uniformity of the oxide layer thin film is deteriorated.

On the other hand, the method for manufacturing a photoelectrode according to the present application generates an electrochemical reaction on the device surface and forms an oxide layer thin film through a slow reaction so that it is possible to control the oxide layer thin film in nano units, and accordingly forms a uniform oxide layer thin film with respect to the entire device so that the electrical and optical properties of the photoelectrode are improved as a result.

Further, although the oxide layer thin film formed by the heat treatment process causes many defects at the interface due to a crystal structure different from that of an existing device, the oxide layer thin film formed through the method for manufacturing a photoelectrode according to the present application is subjected to epitaxial growth in the existing device so that defects at the interface are improved.

Further, the photoelectrochemical efficiency of the first transition metal oxide is improved as defect sites on the surface of the first transition metal oxide are self-healed due to the photo-charging effect by the light irradiation.

According to an embodiment of the present application, the voltage may be 1.6 V to 3.0 V, but the present application is not limited thereto.

According to an embodiment of the present application, the oxidation reaction of copper (I) oxide starts from about 1.85 V before light is irradiated, that is, when there is no light, but the oxidation reaction of copper (I) oxide starts from about 1.6 V and the oxidation reaction occurs most rapidly at 1.85 V when voltage is applied while irradiating light (e.g., visible light) as in the present application.

According to an embodiment of the present application, the second transition metal oxide may include a material selected from the group consisting of $CuO$, $TiO_2$, $Fe_2O_3$, $In_2O_3$, $Ta_2O_5$, $WO_3$, $ZnO$, $BiVO_4$, $BaSnO_3$, $CuWO_4$, $CuFeO_2$, $BaTiO_3$, $SnO_2$, $CuBi_2O_4$, $Ga_2O_3$, $Bi_2O_3$, $Co_3O_4$, $V_2O_5$, and $NiO$, and may preferably be $CuO$, but the present application is not limited thereto.

For example, when the first transition metal oxide is copper (I) oxide ($Cu_2O$), a copper (II) oxide ($CuO$) thin film may be formed on the surface due to an oxidation reaction.

As described above, the second transition metal oxide thin film formed by being oxidized by voltage and photoreaction at low temperatures can be controlled in nano units, and for example, the second transition metal oxide thin film may have a thickness of 1 nm to 100 nm, but the present application is not limited thereto. For example, the second transition metal oxide thin film may have a thickness of 4 nm, but the present application is not limited thereto.

The second aspect of the present application provides a photoelectrode manufactured by the manufacturing method according to the first aspect of the present application.

With respect to the photoelectrode of the second aspect of the present application, detailed descriptions of parts overlapping with those of the first aspect of the present application have been omitted, but even if the descriptions have been omitted, the contents described in the first aspect of the present application may be equally applied to the second aspect of the present application.

A uniform second transition metal oxide thin film is formed in the photoelectrode according to the present application to improve the separation efficiency and transport efficiency of electron-hole pairs that are photoexcited in the photoelectrode so that the performance of the photoelectrochemical cell may be improved.

Further, since the photoelectrode according to the present application may be manufactured by a simple process at a low temperature and non-vacuum state, the manufacturing process may be simplified, it may be manufactured even at low cost, and economic efficiency may be excellent.

Further, the photoelectrode according to the present application has improved electrical and optical properties since a uniform oxide layer is formed on the surface through a slow electrochemical reaction.

Further, the oxide layer formed on the surface of the photoelectrode according to the present application has improved defects on the surface by being subjected to epitaxial growth.

Further, the photoelectrode according to the present application has increased the photoelectrochemical efficiency of the metal oxide by self-healing defect sites on the surface due to the photo-charging effect during the process.

The third aspect of the present application provides a photoelectrochemical cell comprising the photoelectrode according to the second aspect of the present application and a counter electrode, wherein the photoelectrode and the counter electrode are electrically connected.

With respect to the photoelectrochemical cell of the third aspect of the present application, detailed descriptions of parts overlapping with those of the first and second aspects of the present application have been omitted, but even if the descriptions have been omitted, the contents described in the first and second aspects of the present application may be equally applied to the third aspect of the present application.

According to an embodiment of the present application, the counter electrode may include a material selected from the group consisting of Pt, C, Au, Cu, Fe, Ni, Ir, Pd, and Ta, but the present application is not limited thereto.

Hereinafter, the present disclosure will be described in more detail through Examples, but the following Examples are for illustrative purposes only and are not intended to limit the scope of the present application.

EXAMPLE

An indium tin oxide (ITO) electrode was formed on a glass substrate, and a $Cu_2O$ thin film was deposited on the ITO electrode through an electrochemical deposition process.

Subsequently, after a $Cu_2O$ substrate was probed in a KOH solution, a voltage of 1.8 V was applied along with visible light to induce a slow oxidation reaction of a $Cu_2O$ surface, thereby manufacturing a photoelectrode in which the $Cu_2O$ surface was covered with very thin CuO.

Experimental Example 1

Figure 1:
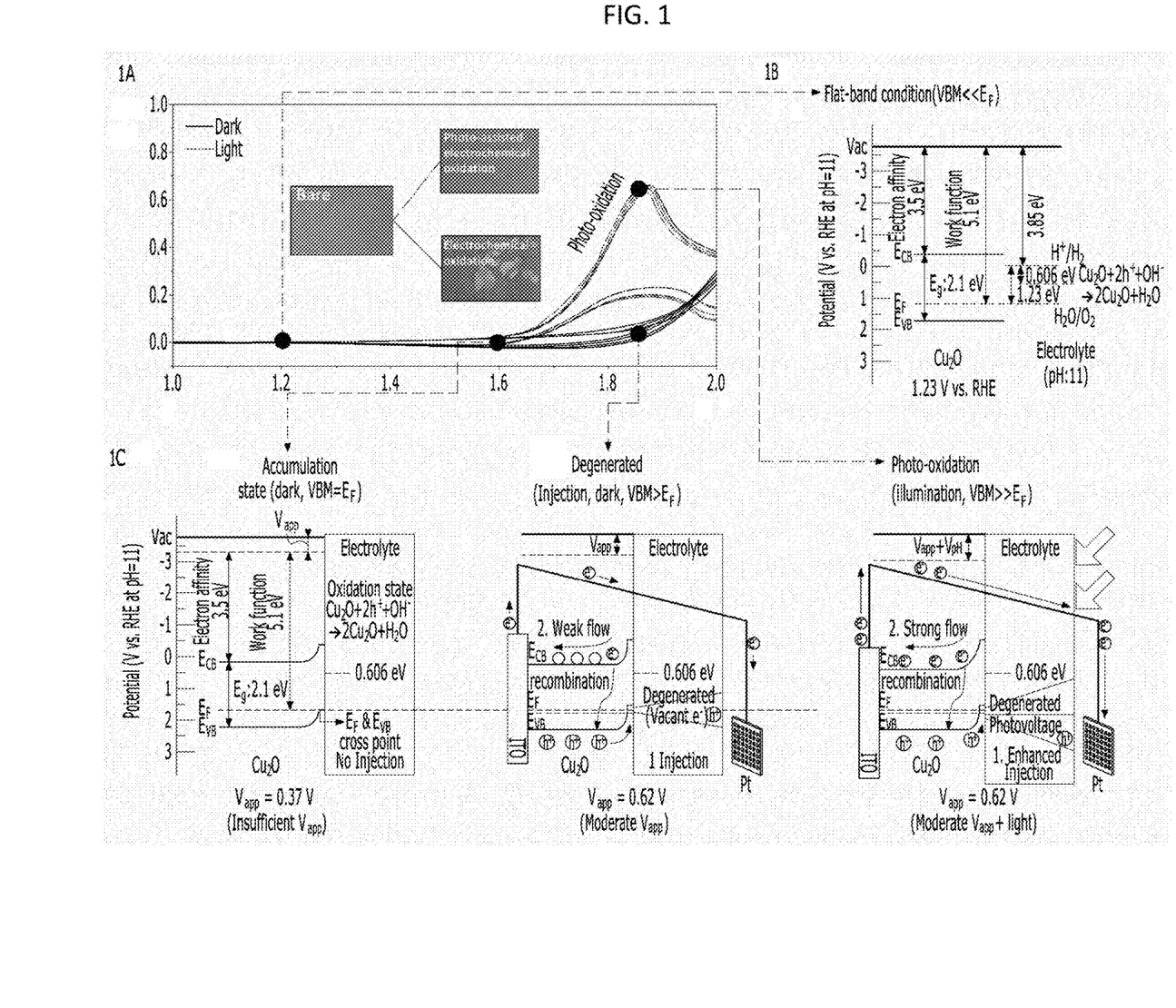
FIG. 1, including portions 1A to 1O, schematizes a voltage-current graph when an oxidation reaction of a copper (I) oxide electrode according to an embodiment of the present application is induced in an electrolyte and movements of charges depending on whether there is visible light or not.

FIG. 1 schematizes a voltage-current graph when an oxidation reaction of a copper (I) oxide electrode according to an embodiment of the present application is induced in an electrolyte and movements of charges depending on whether there is visible light or not.

1A of FIG. 1 is a voltage-current graph when the copper (I) oxide electrode according to the embodiment induces an oxidation reaction in the electrolyte.

1C of FIG. 1 schematizes the movements of charges depending on whether there is visible light or not when the copper (I) oxide electrode according to an embodiment of the present application induces an oxidation reaction in the electrolyte.

Through this, it could be confirmed that the oxidation reaction of copper (I) oxide started from about 1.85 V as the voltage was increased in the absence of light, and the oxidation reaction started from about 1.6 V when irradiated with visible light, and the oxidation reaction was occurred most quickly at 1.85 V.

Experimental Example 2

Figure 2:
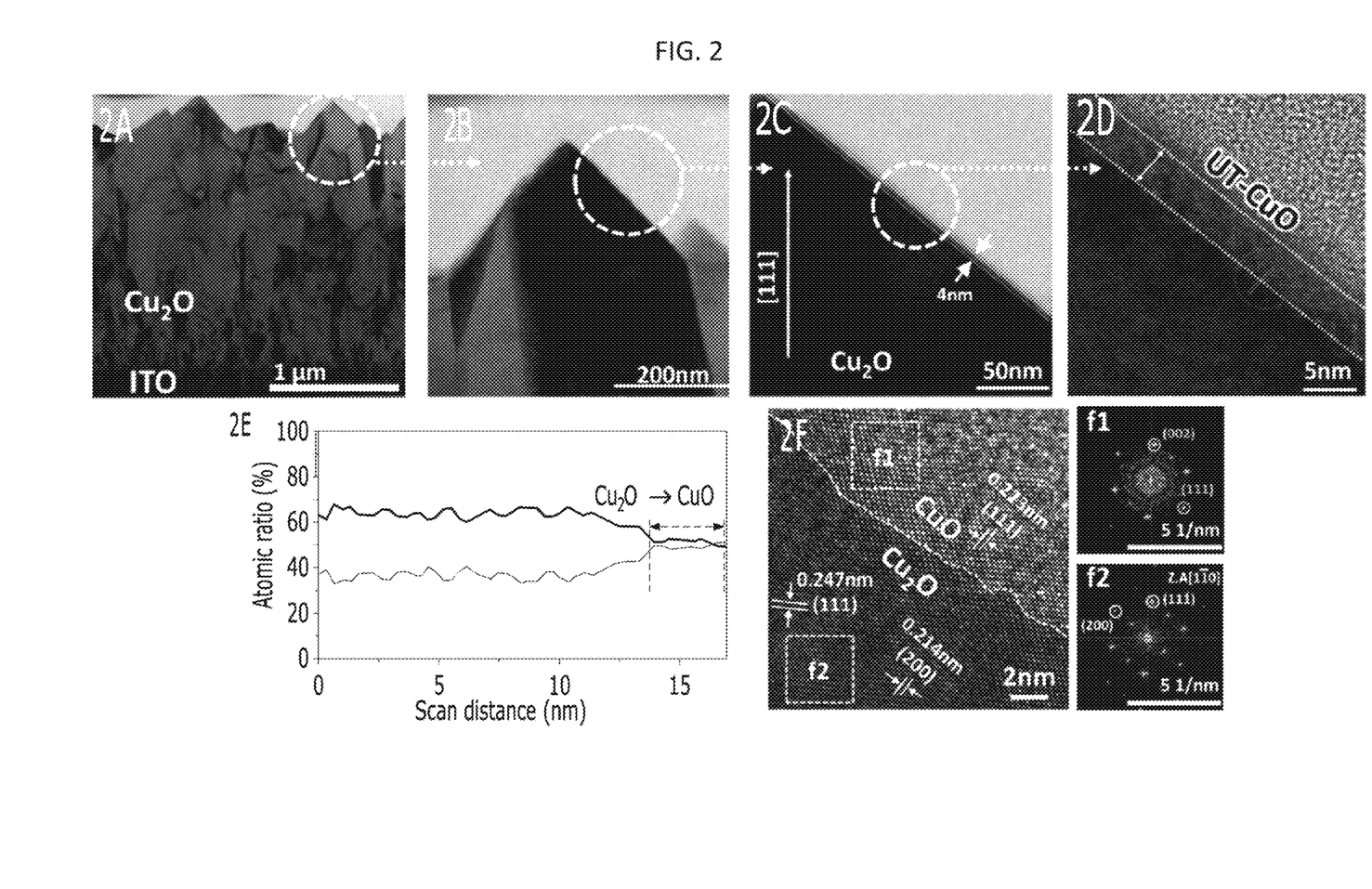
FIG. 2, including portions 2A to 2F, is results of analyzing, through a transmission electron microscope, a device in which a copper (II) oxide thin film is formed on the surface of copper (I) oxide through a photoelectrochemical oxidation process according to an embodiment of the present application.

FIG. 2 is results of analyzing, through a transmission electron microscope, a device in which a copper (II) oxide thin film is formed on the surface of copper (I) oxide through a photoelectrochemical oxidation process according to an embodiment of the present application.

2A to 2D of FIG. 2 are images of a device in which a copper (II) oxide thin film is formed on the surface of copper (I) oxide, photographed by a transmission electron microscope.

Through this, it could be confirmed that a uniform copper (II) oxide thin film of 4 nm was formed on the copper (I) oxide surface.

2E of FIG. 2 is a graph showing the ratio of Cu and O in copper oxide in the process in which copper (I) oxide is oxidized into copper (II) oxide.

2F of FIG. 2 is high resolution images and diffraction patterns for copper (I) oxide and copper (II) oxide planes.

Through this, it could be confirmed that the (200) plane of copper (I) oxide and the (111) plane of copper (II) oxide were epitaxially grown in parallel.

Experimental Example 3

Figure 3:
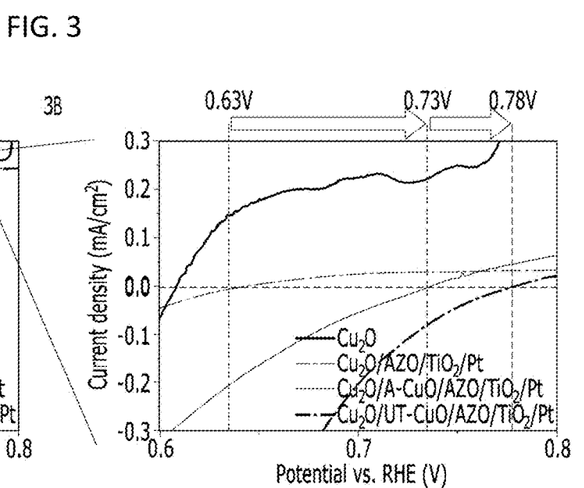
FIG. 3, including portions 3A to 3D, is voltage-current, voltage-$1/(C^2)$, and voltage-resistance graphs for a copper (I) oxide-based photoelectrode chemical cell according to an embodiment of the present application and control group cells.

FIG. 3 is voltage-current, voltage-$1/(C^2)$, and voltage-resistance graphs for a copper (I) oxide-based photoelectrode chemical cell according to an embodiment of the present application and control group cells.

3A and 3B of FIG. 3 are voltage-current graphs for a copper (I) oxide-based photoelectrode chemical cell according to an embodiment of the present application and control group cells.

3C of FIG. 3 is a voltage-$1/(C^2)$ graph for a copper (I) oxide-based photoelectrode chemical cell according to an embodiment of the present application and a control group cell.

3D of FIG. 3 is a voltage-resistance graph for a copper (I) oxide-based photoelectrode chemical cell according to an embodiment of the present application and a control group cell.

Through this, it could be confirmed that a copper (I) oxide-based photoelectrode chemical cell ($Cu_2O$/UT-CuO/AZO/$TiO_2$/Pt) manufactured through the process proposed in the present application has improved photocurrent, open circuit voltage, carrier density, and electrical conductivity compared to a control group cell ($Cu_2O$/A-CuO/AZO/$TiO_2$/Pt) manufactured through the heat treatment process.

Experimental Example 4

Figure 4:
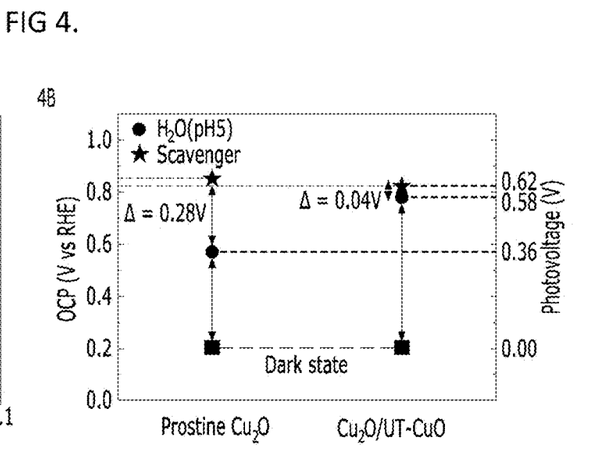
FIG. 4, including portions 4A to 4C, schematizes open circuit voltage changes and photo-charging effect according to time of a copper (I) oxide-based photoelectrode chemical cell manufactured through the process according to an embodiment of the present application and control group cells.

FIG. 4 schematizes open circuit voltage changes and photo-charging effect according to time of a copper (I) oxide-based photoelectrode chemical cell manufactured through the process according to an embodiment of the present application and control group cells.

4A and 4B of FIG. 4 are graphs showing changes in open circuit voltage over time of a copper (I) oxide-based photoelectrode chemical cell manufactured through the process according to an embodiment of the present application and control group cells.

Through this, although the copper (I) oxide-based photoelectrode manufactured through the process proposed in the present application shows a constant open circuit voltage over time, it could be confirmed that the open circuit voltage decreased rapidly as time passed in the photoelectrode manufactured through the heat treatment process and the copper (I) oxide single-layer photoelectrode.

4C of FIG. 4 schematizes the photo-charging effect of the copper (I) oxide-based photoelectrode chemical cell manufactured through the process according to an embodiment of the present application.

Although many defect sites exist on the surface of the initial copper (I) oxide photoelectrode, the defect sites may be eliminated by filling the defect sites with photo-excited charges through the photo-charging effect in the electrolyte.

Thereafter, when a photoelectrochemical oxidation process is performed, the surface of copper (I) oxide may be oxidized into copper (II) oxide while maintaining the photo-charging effect.

The foregoing description of the present application is for illustration, and those with ordinary skill in the art to which the present application pertains will be able to understand that it can be easily modified into other specific forms without changing the technical spirit or essential features of the present application. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present application is indicated by the claims to be described later rather than the above detailed description, and all changes or modified forms derived from the meaning and scope of the claims and equivalent concepts thereof should be construed as being included in the scope of the present application.

What is claimed is:

1. A method for manufacturing a photoelectrode, the method comprising steps of:
   impregnating a first transition metal oxide capable of performing photoreaction in an electrolyte;
   applying a voltage onto the electrolyte to generate an electrochemical oxidation reaction on a surface of the first transition metal oxide; and
   forming a second transition metal oxide film on the surface of the first transition metal oxide by irradiating light onto the first transition metal oxide at the same time as the step of applying the voltage,
   wherein the second transition metal oxide film has a thickness of 1 nm to 4 nm.

2. The method of claim 1, wherein the oxidation reaction is promoted on the surface of the first transition metal oxide by irradiating the light, and the surface defects of the first transition metal oxide are self-healed by photo-charging.

3. The method of claim 1, wherein the second transition metal oxide includes a material selected from the group consisting of CuO, $TiO_2$, $Fe_2O_3$, $In_2O_3$, $Ta_2O_5$, $WO_3$, ZnO, $BiVO_4$, $BaSnO_3$, $CuWO_4$, $CuFeO_2$, $BaTiO_3$, $SnO_2$, $CuBi_2O_4$, $Ga_2O_3$, $Bi_2O_3$, $CO_3O_4$, $V_2O_5$, and NiO.

4. The method of claim 1, wherein the method for manufacturing the photoelectrode is performed at room temperature.

5. The method of claim 1, wherein the voltage is 1.6 V to 3.0 V.

6. The method of claim 1, wherein the electrolyte has a pH of 8 to 13.

7. The method of claim 1, wherein the first transition metal oxide is formed on a substrate.

8. The method of claim 7, wherein the substrate is transparent.

9. The method of claim 7, wherein the substrate includes one selected from the group consisting of ITO, metal nanowires, carbon nanotubes, and combinations thereof.

10. A photoelectrode manufactured by the method according to claim 1.

11. A photoelectrochemical cell comprising the photoelectrode according to claim 10 and a counter electrode, wherein the photoelectrode and the counter electrode are electrically connected.

12. The photoelectrochemical cell of claim 11, wherein the counter electrode includes a material selected from the group consisting of Pt, C, Au, Cu, Fe, Ni, Ir, Pd, and Ta.

* * * * *